United States Patent Office 3,365,058
Patented Jan. 23, 1968

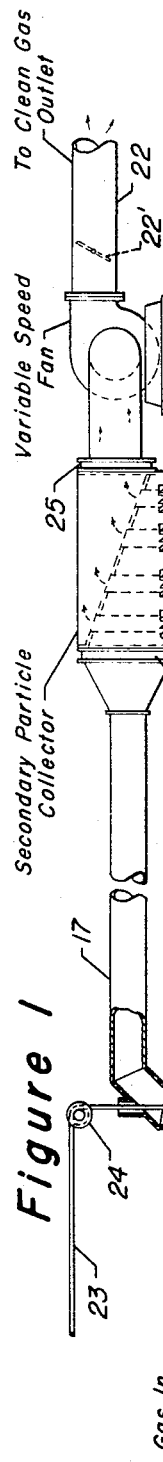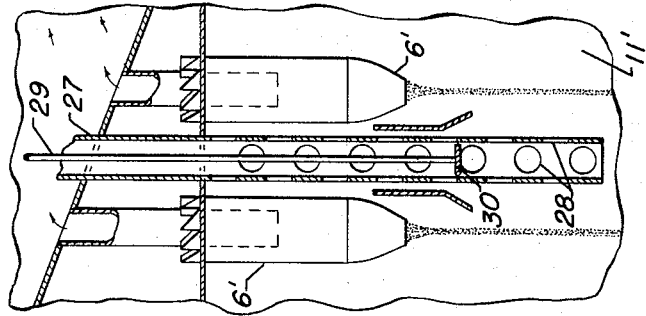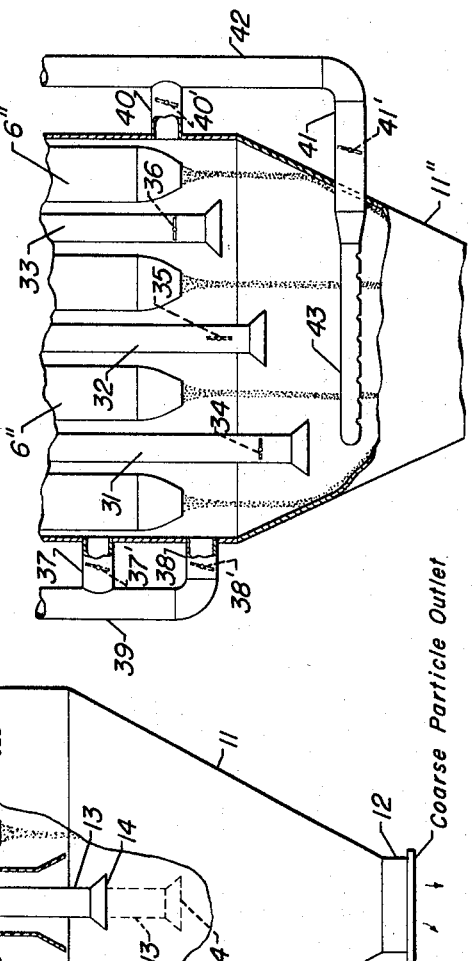

3,365,058
PARTICLE CLASSIFYING-SEPARATING
APPARATUS
Alfred Arnold Petersen, Greenwich, Conn., assignor to
Universal Oil Products Company, Des Plaines, Ill., a
corporation of Delaware
Filed July 6, 1965, Ser. No. 469,661
11 Claims. (Cl. 209—144)

The present invention relates to an improved form of particle classifying-separating apparatus and more particularly to a separator or collector system which provides for an adjustable control of the split between particle sizes in effecting the classification thereof.

In the operation of power plants equipped with coal burning stokers, or with certain other industrial operations, it is often desirable to separate and collect a certain portion of the solid particulates which are being discharged or carried along with a gaseous stream. The classification of particle sizes can be effected by aspirating from the collector bin or hopper of a first stage of separation a certain percentage of the total gas stream entering the collector zone. The aspirated stream of gas and entrained particles is then carried to a secondary stage of particle separation. By such aspiration there will be a resulting classification of collected material into a portion comprising relative coarse particles for reuse, as for example, a reburning of coarse fly ash in a furnace, and a portion of relatively fine particles which may be discarded from the system. Conversely, in some industrial operations or processing systems there may be a desire to recycle or reuse the fine portion of the classified particles. The present improved system utilizes centrifugal separator means for effecting a first stage of separation and classification with the larger particulates being collected in a bin or hopper below the separator tubes; however, a second stage of particle collector means receiving an aspirated gas stream from the bin section of the first stage may comprise additional centrifugal separator equipment, electrostatic precipitator means, or various types and arrangements of bag filtering means. Alternatively, there may be a combination of various types of separator means.

Prior types of classifier-collector systems have provided for an air or gas stream withdrawal from a fixed given point or level in the upper portion of the particle collection bin of a first stage centrifugal unit whereby a gas stream laden with fine particulates will be carried to a second stage collection zone. However, with a fixed position inlet or inlets for the aspiration of the gases from the bin, there is, in general, no control for dust sizing and for regulating the split or distribution between particle sizes for reuse and for disposal. The only means of controlling the particle sizing for such types of units is by varying the amount of gas being withdrawn from the hopper of the first stage of collection and being transferred to the second stage of collection; however, this is not always satisfactory. Actually, most industrial processing plants, as well as boiler or furnace installation, encounter variations in the size of the dust or fly ash particulates being formed within the plant because of variable operating conditions, or because of changes in the type of fuel, or in the method of burning, etc., so that it is particularly desirable to have a wide range of control over the split between particle sizes.

It is therefore a principal object of the present invention to provide a multiple stage classifier-collector system which easily permits an adjustable control of the split between particle sizes without having to vary the amount of the gas stream being carried to a second stage collector section, although variations in gas flow rate or suction on the aspiration means may be combined with the improved apparatus arrangement to give still greater control to the system.

A further object of the invention is to provide an apparatus arrangement which embodies means for effecting a mechanical positioning or adjustment of an aspiration nozzle or gas intake means within the hopper of the first stage of particle collection to carry to a secondary stage of particle collection. Stated another way, means is provided for varying the level of the gas intake means connective between the bin section of the first stage means and the gas inlet section to a secondary stage of particle collection, whereby there is a resulting readily controllable means for effecting variations in particle classification.

In providing an improved classifier-collector system with a variable level gas intake from the hopper section of the first stage of particle collection, there are various ways of providing the different levels of aspiration to in turn provide an adjustable control over particle size collection. In one instance there may be an open-ended aspiration tube into the bin section of the first stage of particle collection which may be physically elevated and adjusted to different levels within the bin section. In another instance, there may be utilized a depending aspiration tube means which has a plurality of gas inlet openings along its length and a plunger or sleeve type of valving means arranged to slide along the length of the aspiration tube and block off a selected lower portion thereof to in turn control the effective gas intake level into the aspiration tube itself. In still another arrangement, there may be a plurality of open-ended aspiration tubes or gas intakes which are positioned at varying levels within the upper portion of the bin section and valve means operating in conjunction with each of the aspirator tubes or gas intakes so as to close off one or more of the tubes but leaving at least one aspiration tube operable to pull a gas stream inwardly from within the bin section at an optimum level to effect the desirable particle size classifications. The adjustment with respect to the gas stream pick-up level operates on the known fact that the upper portion of the hopper will have a less concentration of dust particles than the lower section of the hopper. Also, the upper section will contain the relatively fine particles while the coarser particles will be concentrated in the lower levels of the hopper. Thus, by adjusting the level of the gas stream intake or the pick-up end of the aspiration nozzle there can be any desired split between particle sizes for re-circulation or disposal aspects regardless of dust fineness at the collector inlet. For example, when the collection system is being utilized to separate fly ash from a furnace waste gas stream, there can be a split between the larger and finer particles to obtain the larger particles, which contain the higher percentages of combustibiles, to permit their return into the furnace proper. The smaller particles with the lesser amount of combustibiles and low heat value may be removed from the system with but little monetary loss.

Reference to the accompanying drawing and the following description thereof will serve to better set forth the present improved arrangement of the classifier-separator system, as well as further advantageous features in connection therewith.

FIGURE 1 of the drawing is a diagrammatic elevational view, partially in section, indicating means for effecting a variable level gas intake to an aspiration tube which connects with a second stage of particle collection.

FIGURE 2 of the drawing shows in a partial sectional elevational view a modified arrangement for obtaining a varying level gas intake to an aspiration tube from the bin of a first stage of particle collection.

FIGURE 3 of the drawing also shows in a partial sectional elevational view a multiple aspiration tube arrangement permitting gas intake from varying levels in the bin portion of a first stage of particle collection.

Referring now particularly to FIGURE 1 of the drawing, there is shown a first stage centrifugal particle separator unit 1, having a gas inlet opening 2 leading into a gas-particle distributing chamber 3 which is defined by a lower horizontal tube sheet 4 and an upper sloping tube sheet 5. The horizontal tube sheet 4 supports the upper ends of a plurality of centrifugal separator tubes 6 which in turn are provided at their inlet ends with a plurality of sloping or spiral shaped vanes 7. These vanes are spaced peripherally around the inside upper wall portions of the separator tubes 6 and externally around the mid portions of axially positioned gas off-take tubes 8. The cleaned gas stream rising from the tubular members 8 and from an outlet plenum section 9 is discharged by way of outlet port 10. Within each of the separator tubes 6, the centrifugal flow of the gas stream, as provided by the spiral vanes 7, effects the usual outward spin-off of particles to the inner walls of each of the tubular members 6. The particles then fall on through the lower ends of each of the tubes to the lower discharge end of a bin or particle collection hopper 11. The latter is provided as the lower portion of the separator 1 in order to support tube sheet 4 and to enclose the area around the plurality of separator tubes 6. Collected particles are continuously discharged from the hopper 11 by way of outlet 12 to suitable conveyor means not shown in the drawing.

In accordance with one embodiment of the present invention, a removable or adjustable open-ended aspirator tube 13, with a flared lower end section 14 is positioned within the upper portion of the bin section 11 whereby a gaseous stream carrying the more finely divided particles may be pulled from the bin zone and carried to a secondary fine particle collector section, indicated as 15. Aspirator tube 13 is shown as being slidable within an upper tube section 16 extending through the plenum sections 3 and 9 and connective with an upper transfer conduit 17. The latter in turn connects with the inlet section 21 of the second stage collector 15 whereby fine particles may be collected in a hopper section 18 and discharged by way of outlet 19 for disposal or for reuse in a particular processing operation. A suction fan 20, which in turn is operated by a motor with adjustable speed driving means is shown connecting with the outlet section 25 of separator 15 to provide suction through the collector 15 and to the aspirator tube 13. The suction fan 20 is also shown as discharging a cleaned gas stream to suitable outlet duct means 22 with a flow control valve means 22'.

In order that there may be adjustability for the lower gas intake end of the aspirator tube 13 and varying classifications in particle sizes for the particles being separated by centrifugal separator tubes 6 and fed into the hopper 11, there is indicated a cable means 23 connected to the upper end of the aspirator tube 13 and working over pulley means 24 that is connective with a winch or other adjustment means not shown. Thus, any desired gas intake level may be obtained by the adjustment of cable 23 causing the intake end 14 of aspirator tube 13 to be positioned at any desired level within bin 11. A dust shield 26 is shown positioned between the aspirator tube 13 and the nearest of the particle separator tubes 6 such that there is no strong interference of particle flow from these separator tubes.

Although not shown in the drawing, there also may be varying types of other baffle means or grids spaced below the outlet ends of the collector tubes in order to preclude the effects of eddy action from interfering with particle classification.

In the operation of the present classifier-collector system, as hereinbefore noted, there will be a greater withdrawal of particles, including some of the heavier particles, where the aspirator nozzle 13 is lowered to a lowermost level in bin 11 such that the aspirated gas stream will have a greater proportion of heavier particles. Conversely, where the aspiration tube 13 is raised to a high level in bin 11, there will be a greater percentage of fine particles and a minimum of the heavier or coarse particles such that the aspirated gas stream from the upper portion of bin 11 will carry primarily ultra-fine particulates to the secondary particle collection zone 15.

It is to be understood that the secondary particle collector means need not be of any particular type but may comprise the centrifugal form, the electrostatic type or bag filtering means, depending upon the type of efficiencies desired in the collection of such fine particles or depending upon the degree of atmospheric pollution which may be permissible in a particular area. It may also be noted, that variations in the speed of fan 20 may be effected by adjustable drive means in combination with adjustments in the level of the gas intake for the aspirator tube 13 so as to provide still greater control of the particle classification being carried out between the first stage of collection in bin 11 and that being effected in the secondary stage 15. Still further, it should be pointed out that a similar type of adjustable level aspirator tube construction may be used in combination with a single large centrifugal separator being used for the first stage unit in lieu of the use of the multiple separator tube construction.

Referring now to FIGURE 2 of the drawing, there is shown still another modified form of adjustment for the gas intake level to a gas aspirator means such as provided with a special tube 27. In this instance tube 27 is provided with a plurality of holes or openings 28 spaced vertically throughout the lower portion thereof which projects downwardly into the interior of a bin section 11'. Here again, centrifugal separation of particulates is carried out in a first stage particle separation zone by a plurality of spaced separator tubes 6' which are operating in the manner described in connection with FIGURE 1 of the drawing.

Various types of adjustable plungers or sleeve type valve means may be operated in conjunction with the aspirator tube 27 so as to provide the desired adjustment of the effective gas intake level into the tube itself and whereby to effect the suction of a gaseous stream with entrained finely divided particulates to a secondary particle collecting zone. In the present drawing there is indicated a simplified form of adjustment, with a rod 29 and a diaphragm or other transverse valve member 30 which serves to block-off gas flow upwardly through the lower end of the tube 27 as well as gas flow into such holes 28 as may be below the level of the member 30. In the operation of this adjustment means, where the rod 29 with valve member 30 is lowered to the lowermost end of tube 29, then the lowermost of the side holes or openings 28 can permit the intake of a gaseous stream and entrained particulates from a lower-most portion of the bin section 11'. On the other hand, where the adjustment rod 29 is raised to an intermediate or high position, then the lower valve member 30 will block flow upwardly into the aspirator tube 27 from the lower openings 28 and only the openings 28 above the level of the valve will be effective in admitting a gas stream into the aspiration tube 27 and still finer particles will be entrained and carried to the secondary particle collecting means. Where ultra-fine adjustment may be required in the classification of particles then the inner plunger or valving means may comprise a cylindrical sleeve like member with one or more openings therein to in turn match one or more closely positioned holes or openings 28 in the aspirator tube member 27 such that only those openings in alignment with the movable sleeve will permit a gas intake from a predetermined level into the aspirator tube itself and to the secondary collector means. In other words, those openings 28 which are below the openings of the sleeve valve as well as above the openings in the sleeve will be blocked from permitting the admission of any gases from the bin 11' into the tube 27.

Referring now to FIGURE 3 of the drawing, there is shown still another modified means for obtaining varying levels of gas intake from a bin section 11'', whereby to obtain classifications in particle sizes between first and second stages of particles collection. In this instance there is shown diagrammatically a plurality of open-ended depending aspiration tubes 31, 32, and 33 which have fixed position open end sections terminating at varying levels within the interior of bin 11''. Aspirator tube 31 is indicated as being the lowermost of the plurality of tubes in the bin and having a movable and adjustable close off valve means 34; tube 32, with valve means 35 is shown at an intermediate level; and the tube 33 with adjustable valve means 36, is in turn at the highest elevation therein. Actually, the valving means for the aspirator tubes may be of various types and in various locations, as for example in downstream positions which may be exterior to the collector unit, rather than within the gas inlet ends thereof.

As additional or alternative types of aspirator means, there are shown side withdrawal gas intake ducts 37, 38, and 40 with interior flow control or valve means, indicated respectively as 37', 38' and 40'. The intakes 37 and 38 lead to a transfer duct 39, while 40 connects with a transfer duct 42. Such transfer ducts may connect with the header means (not shown) for tubes 34, 35 and 36 or may carry independently to the secondary collector means. Still another modified aspirator design is shown by the perforate horizontal tube means 43 which extends from the interior of bin 11'' to duct 41, with valve means 41', and thence to the transfer duct 42.

In operating an embodiment with multiple level, fixed position gas intakes, there will be the closing of certain of the valving means so as to provide an effective gas intake at only one desired level or area from the interior of the bin 11'' to in turn obtain the desired split in particle sizes between the first and second stages of particle collection. Where a greater percentage of particles is desired to be collected in the first stage unit, then the aspiration will be from the upper inlet means, such as ducts 37 and 40, with valve 37' and 40' being opened and all the other valves being closed in the respective tubes and ducts. On the other hand, where only the heavy or coarser particles are desired to be collected within bin 11'', then the aspiration may be effected through intermediate and/or lower disposed aspiration tube means such that a greater percentage of particulates will carry over the second particle collection section.

As noted in connection with FIGURE 1 of the drawing, the embodiments of FIGURES 2 and 3 may also be combined with varying types of secondary particle collection and the latter need not be limited to a centrifugal type of separation. Also, a variable speed suction fan, as well as damper means 22', may be combined with the secondary particle collection stage to in turn effect varying degrees of aspiration from the bin of the first stage particle collection whereby there is a resulting highly efficient overall control of the aspiration and classification of particle sizes in the system.

In all cases, the present diagrammatic drawings shall not be considered limiting as to the type of construction and arrangement of equipment, including plenum sections, the type of vane means in the centrifugal separator designs, the connection of the first and second stages of particle separation etc., inasmuch as the present improved adjustable and multiple level aspirator means may be utilized from the bin of various types of conventional separator systems.

I claim as my invention:

1. Apparatus for classifying and separating suspended particles from gaseous streams, which comprises in combination, a first stage of particle collection with a gas inlet section, vane means effecting centrifugal gas flow to separator tube means, cleaned gas off-take means, a particle bin section encompassing said separator tube means and extending therebelow, adjustable level gas intake means connective with the interior of said bin, and duct means connecting said gas intake means to the gas inlet section of a secondary fine particle collector means, whereby a varying level gas intake from said bin provides for variable classifications in said bin and within said secondary collector means.

2. The apparatus of claim 1 further characterized in that said adjustable level gas intake means comprises open-ended aspirator tube means extending into the interior of said bin.

3. The apparatus of claim 1 further characterized in that said adjustable level gas intake means comprises a plurality of side wall gas inlet openings at spaced heights from the wall of said bin, with adjustable valving means and duct means from each of said openings.

4. Apparatus for classifying and separating suspended particles from gases, which comprises in combination, a gas inlet plenum chamber, a cleaned gas off-take section, spaced centrifugal tubes depending from said plenum chamber and having open upper end portions to receive dust laden gases therefrom and to discharge centrifugally separated particles downwardly therefrom, said centrifugal tubes each having an off-take pipe extending upwardly therefrom of said gas off-take section, a heavy particle bin below said gas inlet plenum chamber and encompassing said separator tube means, at least one aspirator tube means with a vertically adjustable open-ended gas intake end thereto extending from within said bin and discharging to the gas inlet section of a secondary fine particle collector means whereby adjustably variable classifications in particle sizes may be made in the collection thereof.

5. The apparatus of claim 4 further characterized in that said secondary particle collector means comprises a centrifugal separator means.

6. Apparatus for classifying and separating suspended particles from gases, which comprises in combination, a gas inlet plenum chamber, a cleaned gas off-take section, spaced centrifugal tubes depending from said plenum chamber and having open upper end portions to receive dust laden gases therefrom and to discharge centrifugally separated particles downwardly therefrom, a heavy particle bin below said gas inlet plenum chamber and encompassing said separator tubes, said centrifugal tubes each having an off-take pipe extending upwardly therefrom to said gas off-take section, aspirator tube means extending from within the internal portion of said bin and connecting to a secondary fine particle collector means, multiple level gas intake port means for said aspirator tube means and adjustable valving means therefor providing thereby a varying gas intake level and accompanying variable classifications of particle sizes in said bin in the secondary particle collector means.

7. The apparatus of claim 6 further characterized in that said aspirator tube means comprises at least one depending tubular member having a plurality of vertically spaced gas inlet ports in the wall thereof, and adjustable vertically movable slide valve means for said tubular member providing for the adjustable closing of the lower end portion of said tubular member and of said inlet ports thereto, whereby the intake level to said aspirator tube means is variable.

8. The apparatus of claim 6 further characterized in that said aspirator tube means comprises a plurality of internal tubular members, with each of said plurality of tubular members having gas inlet means at a different level within the interior of said bin to thereby provide a varying height gas intake means to said tubes, and adjustable valving means is combined with each of said tubular members to provide thereby for the selective blocking of said internal tubular members and the desired resulting variations in the classifications of particle sizes.

9. The apparatus of claim 8 still further characterized in that each of said internal tubular members are substantially horizontally disposed at said different levels in said bin and each tubular member has a multiplicity of perforations therein to provide the desired gas intake means.

10. Apparatus for classifying and separating suspended particles from gases, which comprises in combination, a gas inlet plenum chamber, a cleaned gas off-take section, spaced centrifugal tubes depending from said plenum chamber and having open upper end portions to receive dust laden gases therefrom and to discharge centrifugally separated particles downwardly therefrom, said centrifugal tubes each having an off-take pipe extending upwardly therefrom to said gas off-take section, a heavy particle bin below said gas inlet plenum chamber and encompassing said separator tube means, aspiration tube means extending from within said bin to withdraw a gas stream therefrom and being connective with the inlet to a secondary particle collector means, adjustable level gas intake means to said aspirator tube means, suction fan means on the outlet of said secondary collector means pulling a gas stream through the latter from said aspirator tube means, and a variable speed driving means for said suction fan means, whereby varying particle size classifications may be made in said bin and within the secondary collector means responsive to both the variations in the level of the gas intake means to the aspirator tube means and to the gas flow rate from said bin provided by speed variations for said suction fan means.

11. Apparatus for classifying and separating suspended particles from gases, which comprises in combination, a gas inlet plenum chamber, a cleaned gas off-take section, spaced centrifugal tubes depending from said plenum chamber and having open upper end portions to receive dust laden gases therefrom and to discharge centrifugally separated particles downwardly therefrom, said centrifugal tubes each having an off-take pipe extending upwardly therefrom to said gas off-take section, a heavy particle bin below said gas inlet plenum chamber and encompassing said separator tube means, aspiration tube means extending from within said bin to withdraw a gas stream therefrom and being connective with the inlet to a secondary particle collector means, adjustable level gas intake means to said aspirator tube means, suction fan means on the outlet of said secondary collector means pulling a gas stream through the latter from said aspirator tube means and adjustable damper means downstream of said suction fan means to regulate gas flow to the latter, whereby variable classifications in particle sizes may be made responsive to both the variations in the level of the gas intake means to the aspirator tube means and to the gas flow rate from said bin provided by said suction fan means and the damper on the flow therefrom.

References Cited

UNITED STATES PATENTS

| | | | |
|---|---|---|---|
| 2,360,355 | 10/1944 | McBride et al. | 209—144 |
| 2,408,250 | 9/1946 | Crites | 55—338 |
| 2,701,056 | 2/1955 | Morton | 209—144 |
| 2,999,593 | 9/1961 | Stern | 209—144 |
| 3,061,994 | 11/1962 | Mylting | 55—346 |

HARRY B. THORNTON, *Primary Examiner.*

TIM R. MILES, *Examiner.*